US010350950B2

(12) United States Patent
Kim et al.

(10) Patent No.: US 10,350,950 B2
(45) Date of Patent: Jul. 16, 2019

(54) APPARATUS AND METHOD FOR MONITORING TIRE PRESSURE ACCORDING TO TIRE CHARACTERISTIC

(71) Applicant: HYUNDAI AUTRON CO., LTD., Seongnam-si (KR)

(72) Inventors: Tae-Hun Kim, Yongin-si (KR); Dong-Jin Na, Seongnam-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 276 days.

(21) Appl. No.: 15/193,252

(22) Filed: Jun. 27, 2016

(65) Prior Publication Data

US 2016/0375735 A1 Dec. 29, 2016

(30) Foreign Application Priority Data

Jun. 26, 2015 (KR) .................. 10-2015-0091166

(51) Int. Cl.
*G01F 17/00* (2006.01)
*B60C 23/06* (2006.01)
(52) U.S. Cl.
CPC .................. *B60C 23/062* (2013.01)
(58) Field of Classification Search
CPC .................................................. B60C 23/062
(Continued)

(56) References Cited

U.S. PATENT DOCUMENTS 7,263,458 B2 * 8/2007 Hall ...................... B60C 23/061 340/438
2004/0260436 A1 * 12/2004 Kin ...................... B60C 23/061 340/442

(Continued)

FOREIGN PATENT DOCUMENTS

DE 10 2006 032 856 A1 3/2007
DE 10 2008 056 664 A1 6/2009
(Continued)

OTHER PUBLICATIONS

German Patent Office, Office Action for German Patent Application No. 10 2016 211 361.5, dated Feb. 17, 2017, Germany.

*Primary Examiner* — Toan M Le
*Assistant Examiner* — Xiuqin Sun
(74) *Attorney, Agent, or Firm* — Baker & Hostetler LLP; Hyunho Park

(57) ABSTRACT

The present invention relates to an apparatus and a method for monitoring tire pressure according to a tire characteristic. An apparatus for monitoring a tire pressure according to a tire characteristic according to an exemplary embodiment of the present invention includes: a frequency calculating unit calculating a speed interval specific mean frequency by accumulating and averaging frequency data for each speed interval; a tire searching unit searching a tire corresponding to the calculated speed interval specific mean frequency by comparing the calculated speed interval specific mean frequency with a prestored tire specific mean frequency; a low-pressure threshold selecting unit selecting a low-pressure probability threshold depending on the searched tire; and a low-pressure determining unit determining a low pressure by calculating an integration low-pressure probability by integrating frequency and dynamic radius low-pressure probabilities and comparing the selected low-pressure probability threshold and the calculated integration low-pressure probability.

20 Claims, 6 Drawing Sheets

(58) Field of Classification Search
USPC .......................................................... 702/50
See application file for complete search history.

(56) References Cited

U.S. PATENT DOCUMENTS

| | | | |
|---|---|---|---|
| 2014/0046602 A1* | 2/2014 | Wada | B60C 23/00 |
| | | | 702/43 |
| 2016/0001613 A1* | 1/2016 | Shin | B60C 23/062 |
| | | | 340/444 |
| 2016/0082790 A1* | 3/2016 | Kim | B60C 23/062 |
| | | | 340/442 |

FOREIGN PATENT DOCUMENTS

| | | |
|---|---|---|
| DE | 10 2014 117 857 A1 | 1/2016 |
| DE | 10 2014 117 855 A1 | 3/2016 |

\* cited by examiner

APPARATUS AND METHOD FOR MONITORING TIRE PRESSURE ACCORDING TO TIRE CHARACTERISTIC

CROSS-REFERENCE TO RELATED APPLICATIONS

This application claims priority to and the benefit of Korean Patent Application No. 10-2015-0091166 filed in the Korean Intellectual Property Office on Jun. 26, 2015, the entire contents of which are incorporated herein by reference.

TECHNICAL FIELD

The present invention relates to an apparatus and a method for monitoring tire pressure according to a tire characteristic, and more particularly, to an apparatus and a method for monitoring tire pressure, which determines low pressure of a tire by using a low pressure probability threshold according to a tire characteristic.

BACKGROUND ART

Air pressure of a tire is one of elements that allow a vehicle to safely travel. When the air pressure of the tire is low, a vehicle easily slides, and as a result, there is a possibility that the life-span of the tire is shortened and ride comfort and braking force significantly deteriorate. When the air pressure of the tire decreases, functional problems including deterioration of fuel efficiency, tire wear, and the like may occur. In addition, when the decrease in air pressure is significant, there is a possibility that vehicle and human damages such as accident occurrence caused due to a driving inoperability state or tire rupture will occur.

However, since most drivers cannot recognize a change in air pressure of the tire, a tire pressure monitoring system (TPMS) which is a tire pressure monitoring system announcing the change in pressure of the tire to the drivers in real time has been developed.

In recent years, the tire pressure monitoring system (TPMS) is mounted on a vehicle, which detects the decrease in air pressure of the tire mounted on the vehicle and announces the detected decrease in air pressure to the driver.

The tire pressure monitoring system (TPMS) announces the decrease in pressure of the tire to the driver to allow the driver to check a pressure state of the tire, thereby solving the problem.

The TPMS may be generally classified into a direct scheme and an indirect scheme.

The direct scheme of TPMS installs a pressure sensor in a tire wheel to directly measure the air pressure of the tire. The direct scheme of TPMS announces the change in air pressure of the tire, which is measured from the pressure sensor attached to the tire to the driver. The indirect scheme of TPMS indirectly estimates the change in air pressure of the tire through a change of a response characteristic (for example, a rotational velocity or a frequency characteristic of the rotational speed) of the tire, which is generated when the air pressure decreases and announces the indirectly estimated change to the driver.

The indirect scheme of TPMS is a method that estimates the air pressure of the tire from rotation information of the tire. The indirect scheme of TPMS may be, in detail, classified into a dynamic loaded radius (DLR) analysis scheme and a resonance frequency method (RFM) analysis scheme again. They may be briefly called a radius analysis scheme and a frequency analysis scheme.

In the frequency analysis scheme, when the air pressure of the tire decreases, a difference from a tire having a normal air pressure is detected by using that a frequency characteristic of a rotational velocity signal of a wheel is changed. In the frequency analysis scheme, based a resonance frequency which may be acquired by frequency analysis of the rotational velocity signal of the wheel, when the relevant resonance frequency is calculated to be lower than a reference frequency estimated while initialization, it is determined that the air pressure of the tire decreases.

In the radius analysis scheme, by using a phenomenon in which a dynamic loaded radius of the depressurized tire decreases while driving, and as a result, the tire rotates more rapidly than the normal tire, the pressure decrease is detected by comparing rotational velocities of four tires. In the radius analysis scheme of the tire pressure monitoring system, since it is determined whether the tire is depressurized based on a wheel velocity, the wheel velocity exerts a largest influence on the determination of the depressurization.

The direct scheme of TPMS may accurately sense the air pressure of the tire, but the life-span of a battery is limited and whenever the tire is replaced, the direct scheme of TPMS needs to be installed again. In the direct scheme of TPMS, since the pressure sensor is attached, imbalance of the tire may occur and problems including radio frequency interference and the like may occur. Further, since the direct scheme of TPMS is a scheme that mounts the sensor on the tire to measure the air pressure, the indirect scheme of TPMS has an advantage in that the direct scheme of TPMS measure accurate pressure. On the contrary, the direct scheme of TPMS is constituted by various components including a pressure measurement sensor mounted on the tire, a wireless communication unit for transmitting a measurement value in a general wireless scheme, and the like. Therefore, the direct scheme of TPMS is more expensive and further, higher in failure rate than the indirect scheme of TPMS.

Meanwhile, the indirect scheme of tire pressure monitoring system is a scheme that estimates a loss in air pressure by using a wheel speed sensor which is mounted on the vehicle to measure a wheel speed. In the indirect scheme of TPMS, since the TPMS may be implemented only by an algorithm, additional hardware is not required, and as a result, a lot of cost is not consumed and maintenance cost is not also large. The indirect of TPMS has higher price competitiveness than the indirect scheme of TPMS. However, since the resonance frequency of the indirect scheme of TPMS varies depending on the wheel speed, accuracy of the indirect scheme of TPMS slightly deteriorates. Since the estimated change in air pressure of the tire may be different from an actual change, the indirect scheme TPMS may send a false alarm to the driver.

Meanwhile, in the indirect scheme of TPMS, a base line of a low-pressure frequency needs to be accurate in order to distinguish a low-pressure tire by using frequency analysis.

However, the low-pressure base line varies depending on a tire characteristic. Therefore, deciding a currently mounted tire is required to derive the accurate low-pressure base line in the indirect scheme of TPMS.

Reliability of integration logic that performs low-pressure determination by integrating the frequency analysis and the dynamic radius analysis needs to be improved.

SUMMARY OF THE INVENTION

The present invention has been made in an effort to provide an apparatus and a method for monitoring a tire pressure according to a tire characteristic, which search a tire mounted on a vehicle b using a speed interval specific mean frequency and determines a low pressure based on a low-pressure probability threshold depending on the searched tire to accurately select a low-pressure base based on the tire.

The present invention has also been made in an effort to provide an apparatus and a method for monitoring a tire pressure according to a tire characteristic, which determine a low pressure by selecting a low-pressure probability threshold differently according to calibration reliability and comparing the selected low-pressure probability threshold and an integration low-pressure probability for frequency analysis and dynamic radius analysis to determine the accurate low pressure by integrating frequency analysis logic and dynamic radius analysis logic.

An exemplary embodiment of the present invention provides an apparatus for monitoring a tire pressure, including: a frequency calculating unit calculating a speed interval specific mean frequency by accumulating and averaging frequency data for each speed interval; a tire searching unit searching a tire corresponding to the calculated speed interval specific mean frequency by comparing the calculated speed interval specific mean frequency with a prestored tire specific mean frequency; a low-pressure threshold selecting unit selecting a low-pressure probability threshold depending on the searched tire; and a low-pressure determining unit determining a low pressure by calculating an integration low-pressure probability by integrating frequency and dynamic radius low-pressure probabilities and comparing the selected low-pressure probability threshold and the calculated integration low-pressure probability.

The frequency calculating unit may generate effective flags for each speed interval by comparing the number of the frequency data accumulated for each speed interval with a predetermined number and calculate a speed interval specific mean frequency when the effective flags are generated in all speed intervals.

The tire searching unit may calculate reliability of frequency calibration by comparing the speed interval specific mean frequency with a prestored tire specific mean frequency and search a tire having a predetermined calibration level or more when the calculated reliability of the frequency calibration and the predetermined calibration level are compared.

The tire searching unit may select a predetermined tire as a tire mounted on a vehicle when the number of calculation times of the calculated reliability of the frequency calibration is equal to or more than a predetermined number of calculation times.

The low-pressure threshold selecting unit may select a low-pressure probability threshold by changing a predetermined low-pressure probability value according to the calculated calibration reliability.

The low-pressure threshold selecting unit may select the low-pressure probability threshold by decreasing the predetermined low-pressure probability value as the calculated calibration reliability is higher and select the low-pressure probability threshold by increasing the predetermined low-pressure probability value as the calculated calibration reliability is lower.

The low-pressure determining unit may determine the low pressure by a multiplying event of a frequency alarm and a dynamic radius alarm according to a Bayes' Rule and determine disturbance as a constant to calculate the integration low-pressure probability, in order to integrate the frequency and dynamic radius low-pressure probabilities.

The low-pressure determining unit may determine the low pressure by comparing a predetermined low-pressure probability value and a predetermined dynamic radius low-pressure probability when a driving speed of the vehicle is more than a predetermined driving speed.

When the low-pressure determining unit determines that all tires of tires of 4 wheels mounted on the vehicle are at the low pressure, the low-pressure determining unit may determine the low pressure by comparing the selected low-pressure probability threshold and the frequency low-pressure probability.

The apparatus may further include a data storing unit storing at least one of a predetermined speed interval specific mean frequency of each tire, a predetermined low-pressure probability value, and the calibration level value depending on the calibration reliability.

Another exemplary embodiment of the present invention provides a method for monitoring a tire pressure, including: calculating a speed interval specific mean frequency by accumulating and averaging frequency data for each speed interval; searching a tire corresponding to the calculated speed interval specific mean frequency by comparing the calculated speed interval specific mean frequency with a prestored tire specific mean frequency; selecting a low-pressure probability threshold depending on the searched tire; calculating an integration low-pressure probability by integrating a frequency low-pressure probability and a dynamic radius low-pressure probability; and determining a low pressure by comparing the selected low-pressure probability threshold and the calculated integration low-pressure probability.

The method may further include generating a speed interval specific effective flag by comparing the number of the frequency data accumulated for each speed interval with a predetermined number, wherein in the calculating of the mean frequency, when the effective flags are generated in all speed intervals, the speed interval specific mean frequency is calculated.

The method may further include calculating reliability of frequency calibration by comparing the speed interval specific means frequency and a prestored tire specific mean frequency.

In the searching of the tire, the calculated reliability of the frequency calibration and a preset calibration level may be compared with each other to search a tire in which the reliability of the frequency calibration is equal to or more than the preset calibration level.

The method may further include comparing the number of calculation times of the calculated reliability of the frequency calibration and a predetermined number of calculation times with each other, wherein in the searching of the tire, a predetermined tire is selected as a tire mounted on a vehicle when the number of calculation times of the calculated reliability of the frequency calibration is equal to or more than a predetermined number of calculation times.

In the selecting of the low-pressure probability threshold, the low-pressure probability threshold may be selected by changing a predetermined low-pressure probability value according to the calculated calibration reliability.

In the selecting of the low-pressure probability threshold, the low-pressure probability threshold may be selected by decreasing the predetermined low-pressure probability value as the calculated calibration reliability is higher and the low-pressure probability threshold may be selected by increasing the predetermined low-pressure probability value as the calculated calibration reliability is lower.

In the determining of the low pressure, the low pressure may be determined by a multiplying event of a frequency alarm and a dynamic radius alarm according to a Bayes' Rule and disturbance may be determined as a constant to calculate the integration low-pressure probability, in order to integrate the frequency and dynamic radius low-pressure probabilities.

The method may further include verifying whether a driving speed of a vehicle is more than a predetermined driving speed, wherein in the determining of the low pressure, the low pressure is determined by comparing a predetermined low-pressure probability value and a predetermined dynamic radius low-pressure probability.

In the determining of the low pressure, when it is determined that all tires of tires of 4 wheels mounted on the vehicle are at the low pressure, the low pressure may be determined by comparing the selected low-pressure probability threshold and the frequency low-pressure probability.

According to exemplary embodiments of the present invention, a tire mounted on a vehicle is searched by using a speed interval specific mean frequency and a low pressure is determined based on a low-pressure probability threshold depending on the searched tire to accurately select a low-pressure base based on a tire.

According to the exemplary embodiments of the present invention, a low pressure is determined by selecting a low-pressure probability threshold differently according to calibration reliability and comparing the selected low-pressure probability threshold and an integration low-pressure probability for frequency analysis and dynamic radius analysis to determine the accurate low pressure by integrating frequency analysis logic and dynamic radius analysis logic.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
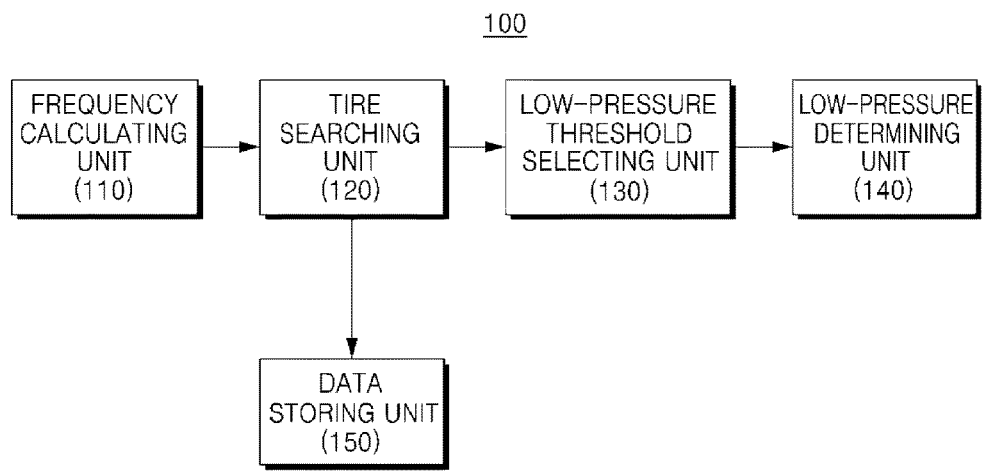
FIG. 1 is a configuration diagram of an apparatus for monitoring a tire pressure according to a tire characteristic according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

In describing the exemplary embodiments, technological contents which are well known in the art included in the specification and are not associated with the specification will not be described. This is to more clearly transfer the spirit of the specification without making the spirit of the specification be ambiguous by omitting unnecessary description.

Due to the same reason, some components are enlarged, omitted, or schematically illustrated. Further, an actual size is not completely reflected on the size of each component. In each drawing, the same reference numeral refers to the same or corresponding component.

FIG. 1 is a configuration diagram of an apparatus for monitoring a tire pressure according to a tire characteristic according to an exemplary embodiment of the present invention.

As illustrated in FIG. 1, the apparatus 100 for monitoring a tire pressure according to the exemplary embodiment of the present invention includes a frequency calculating unit 110, a tire searching unit 120, a low-pressure threshold selecting unit 130, a low-pressure determining unit 140, and a data storing unit 150.

Hereinafter, a detailed configuration and a detailed operation of each of the components of the apparatus 100 for monitoring a tire pressure according to a tire characteristic of FIG. 1 will be described.

The frequency calculating unit 110 calculates a speed interval specific mean frequency by accumulating and averaging frequency data for each speed interval. Herein, the frequency may be a resonance frequency depending on a wheel speed. In detail, the frequency calculating unit 110 detects the resonance frequency depending on a tire air pressure based on speed information acquired form a wheel speed sensor mounted on a wheel of a vehicle and calculates the speed interval specific mean frequency by averaging the resonance frequency for each speed interval. Herein, the speed interval may be divided according to a wheel speed measured by the wheel speed sensor or a speed of a vehicle, which is calculated according to the wheel speed measured by the wheel speed sensor.

When a driver inputs a reset button, the frequency calculating unit 110 accumulates and averages speed interval specific frequency data for each wheel in order to select a low-pressure base line of frequency logic. The frequency is measured from multiple tires mounted on the vehicle. In this case, the frequency of the tire may be excluded, which is measured when the driver excessively steers a handle or steps on a brake pedal or an acceleration pedal.

Herein, the frequency calculating unit 110 compares the frequency data accumulated for each speed interval with a predetermined number to generate a speed interval specific effective flag. That is, the frequency calculating unit 110 may compares the speed interval specific effective flag when the accumulated frequency data is more than the predetermined number for each speed interval.

As one example, the frequency calculating unit 110 calculates a mean frequency of the speed interval specific frequencies. To this end, the frequency calculating unit 110 calculates the mean frequency of frequencies up to a k-th frequency as shown in [Equation 1] given below.

$$\text{mean}(k)=[(k-1)\text{mean}(k-1)+\text{Freq}]/k \qquad \text{[Equation 1]}$$

where, mean(k) represents a mean frequency of frequencies up to a k-th frequency and Freq represents the k-th frequency.

For example, the frequency calculating unit 110 may generate the effective flag by distinguishing the speed interval as an index like "Vel_Valid[index]=1" when the number of frequencies accumulated for each speed interval is 300 or more.

Herein, the index may express the speed interval as shown in [Table 1] given below.

TABLE 1

| Index | Speed interval |
|---|---|
| index = 1 | 30-50 km/h speed interval |
| index = 2 | 50-70 km/h speed interval |
| index = 3 | 70-90 km/h speed interval |
| index = 4 | 90-110 km/h speed interval |
| index = 5 | 110-130 km/h speed interval |

The frequency calculating unit 110 calculates the speed interval specific mean frequency when the effective flag is generated in all speed intervals.

The tire searching unit 120 compares the speed interval specific mean frequency calculated by the frequency calculating unit 110 with a prestored tire specific mean frequency to search the tire corresponding to the calculated speed interval specific mean frequency.

Herein, the tire searching unit 120 compares the speed interval specific mean frequency and the prestored tire specific mean frequency with each other to calculate reliability of frequency calibration. The tire searching unit 120 compares the calculated reliability of the frequency calibration and a preset calibration level with each other to search a tire in which the reliability of the frequency calibration is equal to or more than the preset calibration level.

The tire searching unit 120 compares each tire data stored in a database of the data storing unit 150 and the mean frequency calculated by the frequency calculating unit 110 when the effective flags are generated in all speed intervals to distinguish a tire having a closest mean frequency value as shown in [Equation 2] given below.

$$\text{Tire\_DB\_Number}[\text{Index}]=\text{minimize}(|\text{measured mean frequency}[\text{index}]-\text{DB mean frequency}[\text{index}]|) \qquad \text{[Equation 2]}$$

where, tire_DB_Number[Index] represents a time number in the DB, measured mean frequency[index] represents the mean frequency measured for each speed interval, which is distinguished by the index, and DB mean frequency[index] represents the mean frequency in the DB for each speed interval, which is distinguished by the index.

For example, when it is assumed that the total number of speed intervals is 5, the tire searching unit 120 may search the tire by distinguishing that two or more intervals among 5 speed intervals match each other. In this case, the tire searching unit 120 may grant the reliability of the frequency calibration as shown in [Table 2] given below as the number of speed intervals increases.

TABLE 2

| Match intervals | Calibration_Level |
|---|---|
| 2 intervals match | Calibration_Level = 2 |
| 3 intervals match | Calibration_Level = 3 |
| 4 intervals match | Calibration_Level = 4 |
| 5 intervals match | Calibration_Level = 5 |
| 6 intervals match | Calibration_Level = 6 |

The tire searching unit 120 selects the searched tire as a currently mounted tire when the reliability of the frequency calibration is equal to or more than a predetermined value (for example, calibration level>3). The calibration level is not limited to a specific value, but may be changed.

The tire searching unit 120 may repeat the process of calculating the speed interval specific mean frequency and the process of calculating the reliability until acquiring the predetermined value or more when the reliability of the frequency calibration is equal to or less than the predetermined value. The reliability recalculating process may be performed separately from a reset button input inputted by a user.

Meanwhile, the tire searching unit 120 may select a predetermined tire as the tire mounted on the vehicle when the number of calculation times of the calculated reliability of the frequency calibration is equal to or more than a predetermined number of calculation times. That is, when the number of calculation times of the calculated reliability of the frequency calibration is more than the predetermined number of times, the tire searching unit 120 may select the low-pressure base line based on a predetermined universal tire or a most mounted tire.

The low-pressure threshold selecting unit 130 selects the low-pressure probability threshold depending on the tire searched by the tire searching unit 120. The low-pressure threshold selecting unit 130 selects the low-pressure probability threshold by changing a predetermined low-pressure probability value threshold according to the calibration reliability calculated by the tire searching unit 120.

Herein, the low-pressure threshold selecting unit 130 applies the low-pressure probability threshold differently according to the calibration level of the mean frequency. The low-pressure threshold selecting unit 130 selects the low-pressure probability threshold by decreasing the predetermined low-pressure probability value threshold as the calculated calibration reliability is higher. That is, the case in which the calibration level Calibration_Level is higher represents that the low-pressure probability threshold is more accurately determined. Therefore, since the reliability of a frequency low-pressure probability increases, the low-pressure threshold selecting unit 130 selects the low-pressure probability threshold by decreasing the low-pressure threshold.

The low-pressure threshold selecting unit 130 selects the low-pressure probability threshold by increasing the predetermined low-pressure probability value as the calibration reliability calculated by the tire searching unit 120 is lower. That is, the case in which the calibration level Calibration_Level is lower represents that the low-pressure probability threshold decreases. Therefore, the low-pressure threshold selecting unit 130 determines the low-pressure by increasing the low-pressure probability threshold to reduce sensitivity for a fault alarm.

As one example, the low-pressure threshold selecting unit 130 may select the low-pressure probability threshold depending on the calibration level by multiplying the predetermined low-pressure probability value by a calibration level value Calibration_Level_factor as shown in [Equation 3] given below.

Low-pressure probability threshold=low-pressure probability value×calibration level value [Equation 3]

The calibration level value Calibration_Level_factor in [Equation 3] may be designated as show in [Table 3] given below and the calibration level value is not limited to a specific value, but may be changed.

TABLE 3

| Calibration level | Calibration level value (Calibration_Level_factor) |
|---|---|
| 5 | 0.8 |
| 4 | 0.83 |
| 3 | 0.85 |
| 2 | 1 |
| 1 | 1 |

As shown in [Table 3] given above, since the calibration level value has a value of '1', the predetermined low-pressure probability value has 100% as a base low-pressure probability value. As described above, the low-pressure threshold selecting unit 130 may select the low-pressure probability threshold by multiplying the predetermined low-pressure probability value by the calibration level value as the calibration level is higher.

Meanwhile, the low-pressure determining unit 140 determines the low pressure by calculating an integration low-pressure probability by integrating frequency and dynamic radius low-pressure probabilities and comparing the low-pressure probability threshold selected by the low-pressure threshold selecting unit 130 and the calculated integration low-pressure probability.

As one example, the low-pressure determining unit 140 determines the low pressure by a multiplying event of a frequency alarm and a dynamic radius alarm according to a Bayes' Rule and determines disturbance as a constant to calculate the integration low-pressure probability, in order to integrate the frequency and dynamic radius low-pressure probabilities.

The process of calculating the integration low-pressure probability using the Bayes' Rule will be described as shown in Equations 3 to 5 given below.

First, the low-pressure determining unit 140 calculates the integration low-pressure probability by using the Bayes' Rule as shown in [Equation 4] given below.

$$P(A|F,D,I) \sim P(F,D|A,I)P(A|I)$$ [Equation 4]

where, A represents the low pressure, F represents the frequency alarm, D represents the dynamic radius alarm, and I represent the disturbance.

Since the frequency alarm F and the dynamic radius alarm D are independent items, a P(F, D|A, I) item of [Equation 4] given above may be expressed as shown in [Equation 5] given below.

$$P(F,D|A,I)=P(F|A,I)P(D|A,I)$$ [Equation 5]

where, A represents the low pressure, F represents the frequency alarm, D represents the dynamic radius alarm, and I represent the disturbance.

When it is assumed that P(A|I) is a constant, the integration low-pressure probability calculated based on the frequency alarm F and the dynamic radius alarm D may be expressed as shown in [Equation 6] given below.

$$P(A|F,D,I) \sim P(F|A,I)P(D|A,I) > \text{low probability threshold}$$ [Equation 6]

where, A represents the low pressure, F represents the frequency alarm, D represents the dynamic radius alarm, and I represent the disturbance.

Therefore, the integration low-pressure probability may be expressed as the multiplying event of the frequency alarm F and the dynamic radius alarm D.

The low-pressure determining unit 140 may determine the tire at the low pressure when the integration low-pressure probability calculated by the Bayes' Rule is more than the low-pressure probability threshold based on [Equation 6] given above.

Meanwhile, the low-pressure determining unit 140 may apply a separate low-pressure probability calculation value and a separate low-pressure probability threshold with respect to an exceptional situation when determining the low pressure.

As one example, the exceptional situation at the time of determining the low pressure may be a rapid driving situation (in the case of 120 kph or more) in which the vehicle is driven rapidly. As another example, the exceptional situation at the time of determining the low pressure may be a 4-wheel low-pressure situation in which all of 4 wheels mounted on the vehicle are at the low pressure.

First, when the rapid driving situation is described, in the case where the rapid driving situation is continued, the reliability of the low-pressure probability of the frequency deteriorates.

Therefore, the low-pressure determining unit 140 performs the low-pressure determination only by the dynamic radius analysis except for the frequency analysis. In this case, the low-pressure determining unit 140 applies only the predetermined low-pressure probability value as the low-pressure probability threshold to determine the low pressure. That is, the low-pressure determining unit 140 may determine the low pressure by comparing the predetermined low-pressure probability value and the dynamic radius low-pressure probability when a driving speed of the vehicle is more than a predetermined driving speed.

Next, with respect to the 4-wheel low-pressure situation, when all of 4 wheels are at the low pressure, a dynamic radius probability becomes 0%.

Therefore, the low-pressure determining unit 140 performs the low-pressure determination only by a low-pressure probability from the frequency analysis except for the dynamic radius analysis. In this case, the low-pressure determining unit 140 may determine the low pressure based on the low-pressure probability threshold acquired by applying the calibration level value to the predetermined low-pressure probability value. That is, when the low-pressure determining unit 140 determines 4 wheels at the low pressure, the low-pressure threshold selecting unit 130 may determine the low pressure by comparing the low-pressure probability threshold selected by the low-pressure threshold selecting unit 130 and the frequency low-pressure probability.

Meanwhile, the data storing unit 150 stores data for performing the integration logic of the frequency analysis and the dynamic radius analysis and transmits/receives data related with the low-pressure determination to/from the tire searching unit 120, the low-pressure threshold selecting unit 130, and the low-pressure determining unit 140. The data storing unit 150 may store at least one of a predetermined speed interval specific mean frequency of each tire, a predetermined low-pressure probability value, and the calibration level value depending on the calibration reliability.

Figure 2:
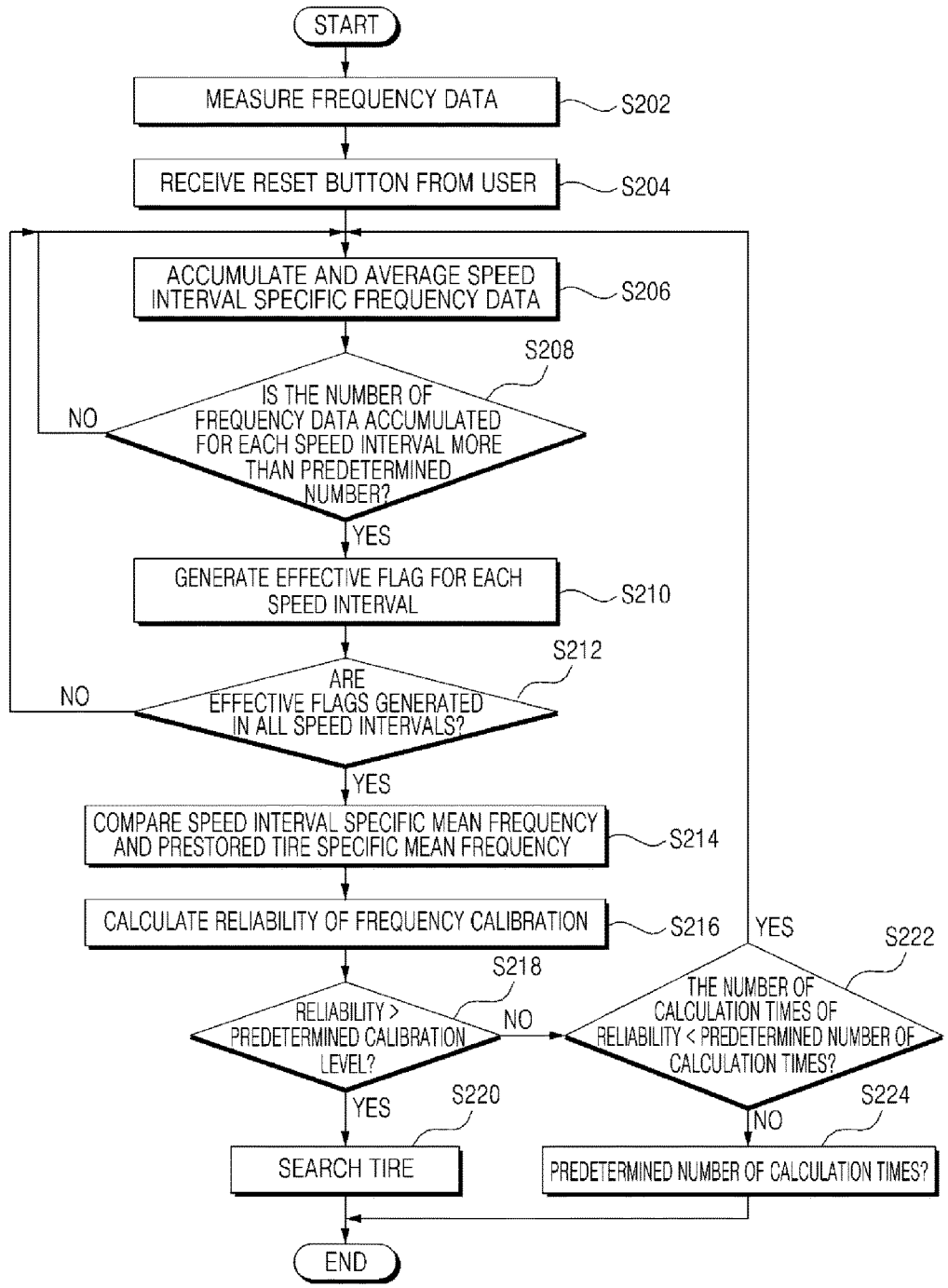
FIG. 2 is a flowchart of a method for searching a tire in an apparatus for monitoring a tire pressure according to an exemplary embodiment of the present invention.

FIG. 2 is a flowchart of a method for searching a tire in an apparatus for monitoring a tire pressure according to an exemplary embodiment of the present invention.

The frequency calculating unit 110 measures the frequency data (S202). In addition, the frequency calculating uaaaaaaanit 110 receives a reset button from the user (S204).

Subsequently, the frequency calculating unit 110 accumulates and averages the frequency data for each speed interval.

Thereafter, the frequency calculating unit 110 verifies whether the frequency data accumulated for each speed interval is more than a predetermined number (S208).

As a result of the verification (S208), the frequency calculating unit 110 generates the effective flag for each speed interval when the frequency data accumulated for each speed interval is more than the predetermined number (S210). On the contrary, as the verification result (S208), the frequency calculating unit 110 performs the steps from step S206 of accumulating and averaging the frequency data for each speed interval again when the frequency data accumulated for each speed interval is not more than the predetermined number.

The frequency calculating unit 110 verifies whether the effective flags are generated in all speed intervals.

As a result of the verification (S212), the tire searching unit 120 compares the speed interval specific mean frequency and a prestored tire specific mean frequency when the effective flags are generated in all speed intervals (S214). On the contrary, as the result of the verification (S212), when the effective flags are not generated in all speed intervals, the frequency calculating unit 110 performs the steps again from step S206 of accumulating and averaging the frequency data for each speed interval.

The tire searching unit 120 calculates the reliability of the frequency calibration by using a comparison result of the speed interval specific mean frequency and the prestored tire specific mean frequency (S216).

Subsequently, the tire searching unit 120 verifies whether the reliability of the frequency calibration is more than a predetermined calibration level (S218).

As a result of the verification (S218), the tire searching unit 120 searches a tire in which the reliability of the frequency calibration is more than the predetermined calibration level and selects the relevant tire as the tire mounted on the vehicle (S220).

On the contrary, as the verification result (S218), the tire searching unit 120 verifies whether the number of calculation times of the reliability of the frequency calibration is less than a predetermined number of calculation times when the reliability of the frequency calibration is not more than the predetermined calibration level (S222).

As a result of the verification (S222), the tire searching unit 120 performs the steps from step S206 of accumulating and averaging the frequency data for each speed interval again when the number of calculation times of the reliability of the frequency calibration is less than the predetermined number of calculation times.

On the contrary, As the verification result (S222), the tire searching unit 120 selects a predetermined tire as the tire currently mounted on the vehicle when the number of calculation times of the reliability of the frequency calibration is equal to or more than the predetermined number of calculation times (S224).

Figure 3:
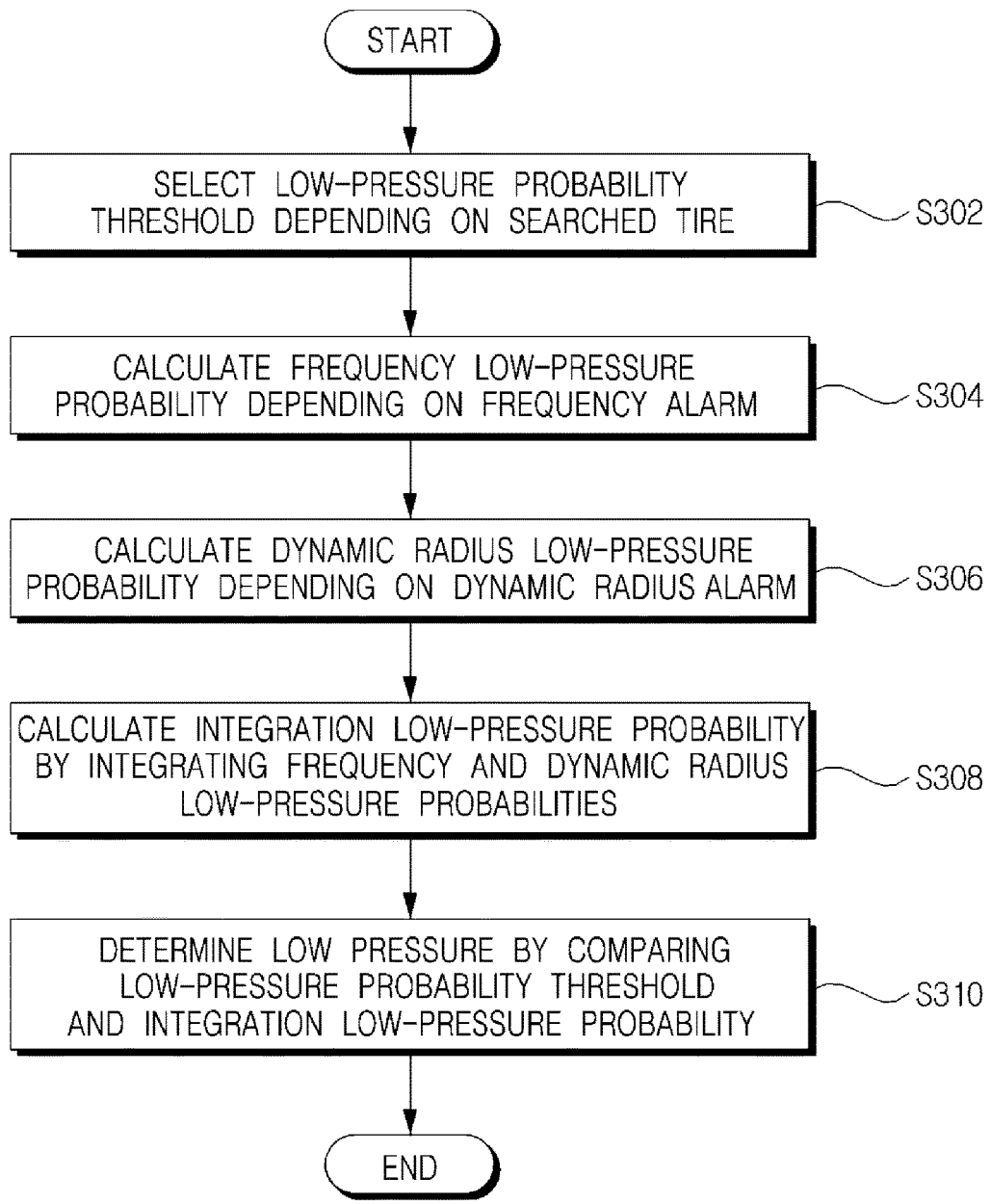
FIG. 3 is a flowchart of a method for determining a low pressure of a tire in an apparatus for monitoring a tire pressure according to an exemplary embodiment of the present invention.

FIG. 3 is a flowchart of a method for determining a low pressure of a tire in an apparatus for monitoring a tire pressure according to an exemplary embodiment of the present invention.

The low-pressure threshold selecting unit 130 selects the low-pressure probability threshold depending on the tire searched by the tire searching unit 120 (S302).

Meanwhile, the low-pressure determining unit 140 calculates the frequency low-pressure voltage depending on the frequency alarm (S304).

The low-pressure determining unit 140 calculates the dynamic radius low-pressure probability depending on the dynamic radius alarm (S306).

The low-pressure determining unit 140 calculates the integration low-pressure probability by integrating the frequency and dynamic radius low-pressure probabilities (S308).

Thereafter, the low-pressure determining unit 140 determines the low pressure by comparing the low-pressure probability threshold selected by the low-pressure threshold selecting unit 130 and the integration low-pressure probability (S310).

Figure 4:
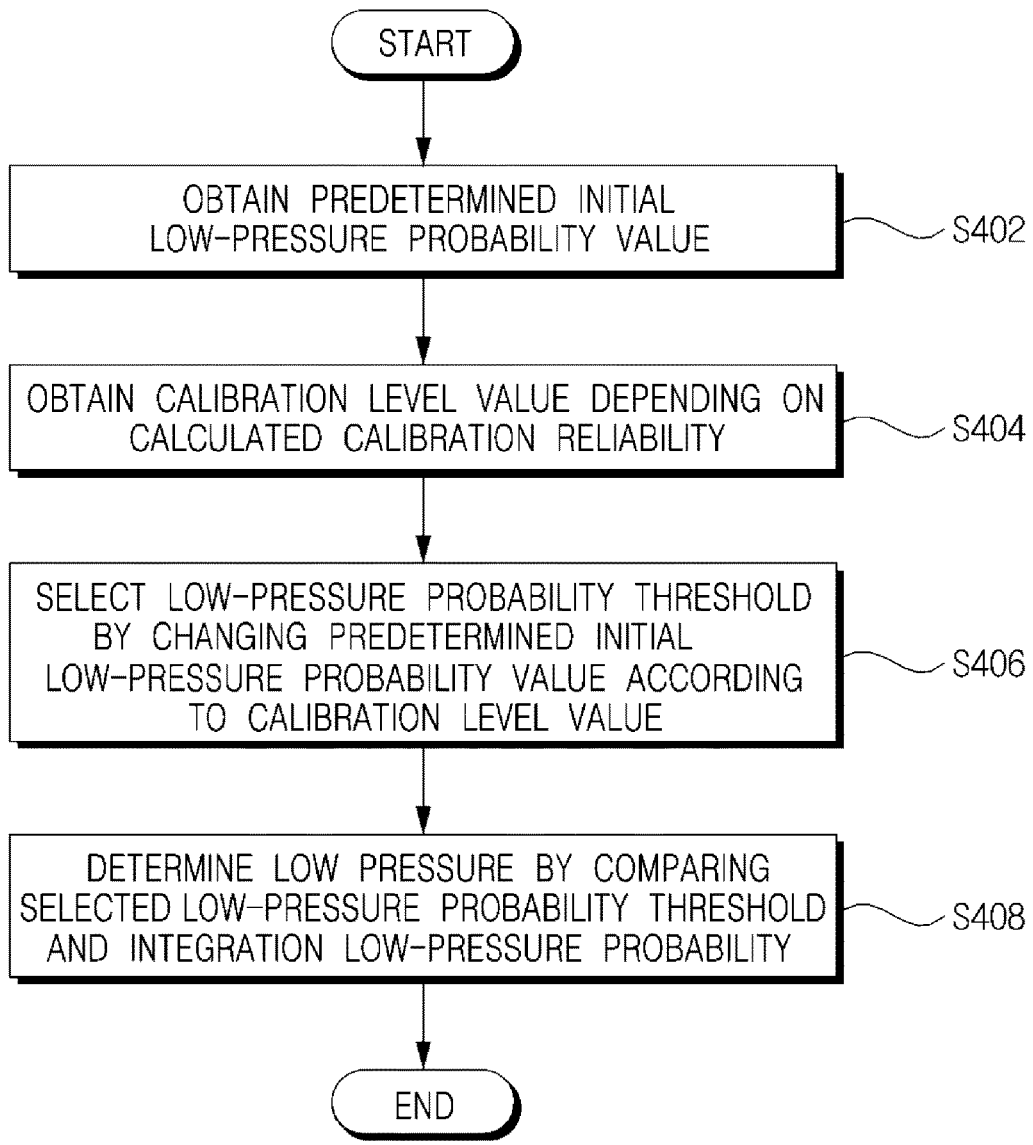
FIG. 4 is a flowchart of a method for selecting a low-pressure in an apparatus for monitoring a tire pressure according to an exemplary embodiment of the present invention.

FIG. 4 is a flowchart of a method for selecting a low-pressure in an apparatus for monitoring a tire pressure according to an exemplary embodiment of the present invention.

The low-pressure threshold selecting unit 130 obtains the predetermined low-pressure probability value (S402).

The low-pressure threshold selecting unit 130 obtains the calibration level value depending on the calibration reliability calculated by the tire searching unit 120 (S404).

Subsequently, the low-pressure threshold selecting unit 130 selects the low-pressure probability threshold by changing the predetermined low-pressure probability value according to the calibration level value (S406).

The low-pressure threshold selecting unit 130 determines the low pressure by comparing the selected low-pressure probability threshold and the integration low-pressure probability (S408).

Figure 5:
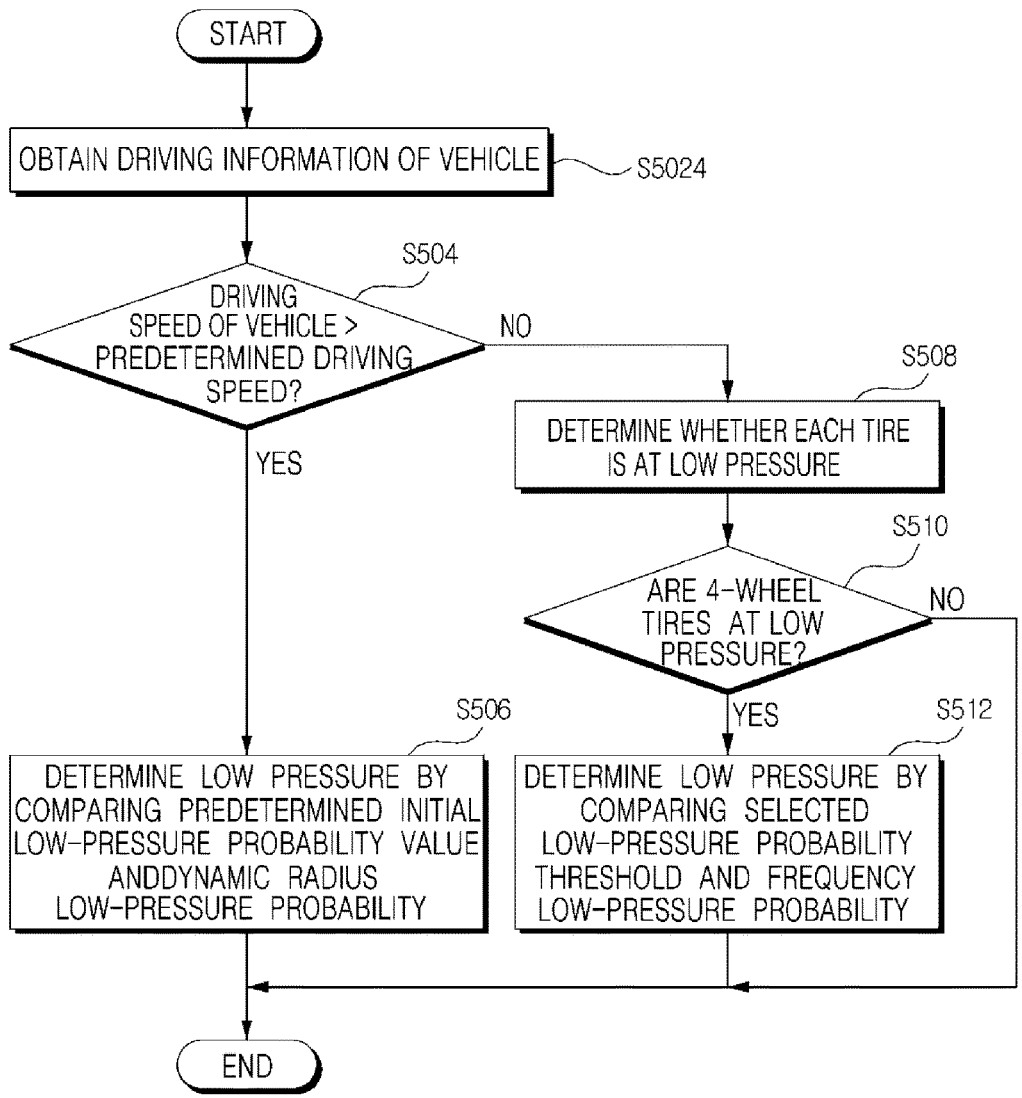
FIG. 5 is a flowchart of a method for determining a low pressure in an exceptional case of low-pressure determination according to an exemplary embodiment of the present invention.

FIG. 5 is a flowchart of a method for determining a low pressure in an exceptional case of low-pressure determination according to an exemplary embodiment of the present invention.

In FIG. 5, the method for determining the low pressure for the exceptional situation at the time of determining the low pressure will be described. As one example, the exceptional situation of determining the low pressure is a situation that the driving speed of the vehicle is more than the predetermined driving speed.

The low-pressure determining unit 140 obtains driving information of the vehicle (S502).

The low-pressure determining unit 140 verifies whether a driving speed of the vehicle is more than a predetermined driving speed (S504).

As a result of the verification (S504), the low-pressure determining unit 140 determines the low pressure by comparing the predetermined low-pressure probability value and the dynamic radius low-pressure probability when the driving speed of the vehicle is more than the predetermined driving speed (S506).

Meanwhile, as the verification result (S504), the low-pressure determining unit 140 determine whether each tire is at the low pressure when the driving speed of the vehicle is not more than the predetermined driving speed (S508).

As a result of the determination (S510), when all tires of tires of 4 wheels mounted on the vehicle are at the low pressure, the low pressure is determined by comparing the selected low-pressure probability threshold and the frequency low-pressure probability (S512).

Figure 6:
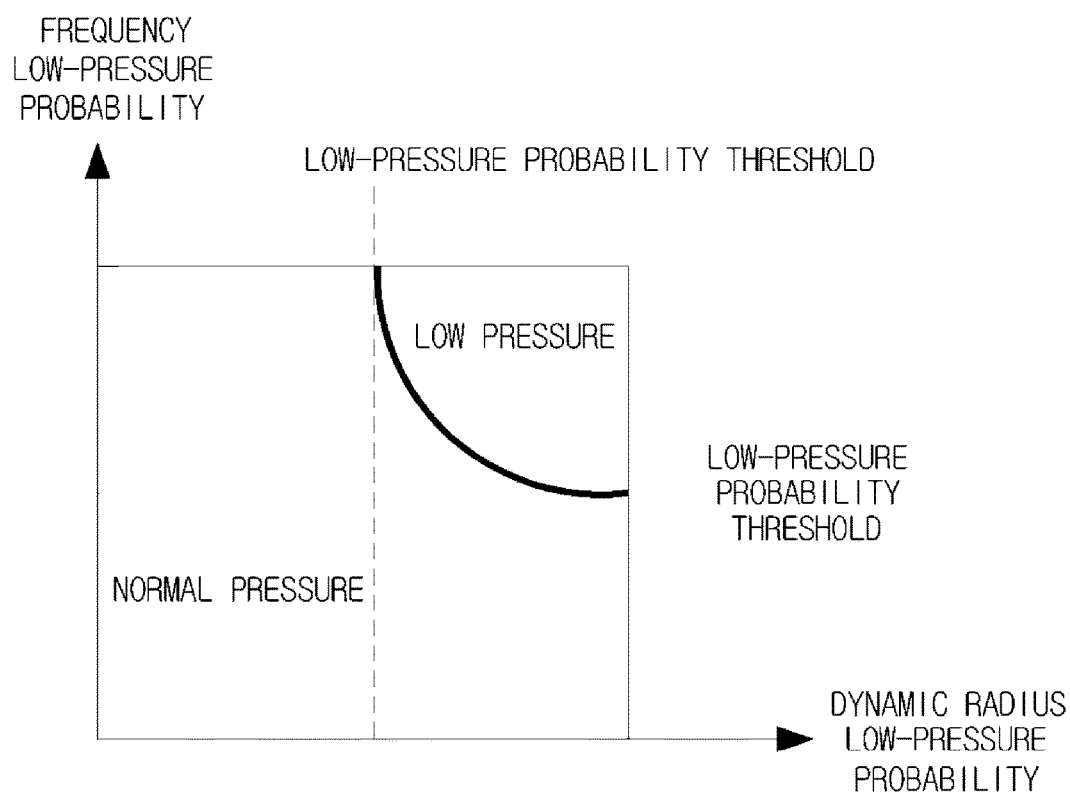
FIG. 6 is an explanatory diagram for a low-pressure probability threshold in integration logic of a frequency and a dynamic radius according to an exemplary embodiment of the present invention.

FIG. 6 is an explanatory diagram for a low-pressure probability threshold in integration logic of a frequency and a dynamic radius according to an exemplary embodiment of the present invention.

In respect to the low-pressure probability threshold, a region for the low-pressure probability threshold may be configured in a form in which the frequency and the dynamic radius low-pressure probability are integrated onto a 2D plane as illustrated in FIG. 6.

In respect to the low-pressure probability threshold, an X axis is configured as the dynamic radius low-pressure probability and a Y axis is configured as the frequency low-pressure probability.

The low-pressure determining unit 140 determines as a low-pressure area an area which exceeds e the low-pressure probability based on a semicircular low-pressure probability threshold illustrated in FIG. 6.

On the contrary, the low-pressure determining unit 140 determines as a normal pressure area the integration low-pressure probability value which belongs to the semi-circular low-pressure probability threshold as a normal-pressure area.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for monitoring a tire pressure according to a tire characteristic in a tire monitoring system (TPMS), the apparatus comprising:
    a wheel speed sensor, wherein the wheel speed sensor is configured to measure a wheel speed to determine a resonance frequency;
    a frequency calculating unit, wherein the frequency calculating unit is configured to determine a speed interval specific mean frequency by determining the resonance frequency using a frequency analysis scheme and accumulating and averaging frequency data for more than one speed interval related to the wheel speed;
    a tire searching unit, wherein the tire searching unit is configured to detect a tire corresponding to the speed interval specific mean frequency by comparing the speed interval specific mean frequency with a prestored tire specific mean frequency;
    a low-pressure threshold selecting unit, wherein the low-pressure threshold selecting unit is configured to select a low-pressure probability threshold from a predetermined low-pressure probability value depending on the detected tire; and
    a low-pressure determining unit, wherein the low-pressure determining unit is configured to determine a low pressure by comparing the selected low-pressure probability threshold with an integration low-pressure probability, wherein the integration low-pressure probability is acquired by integrating the frequency data and dynamic radius low-pressure probabilities,
    wherein the frequency analysis scheme acquires the frequency data from the wheel speed sensor,
    wherein the low-pressure indicates an alarm with regard to an air pressure of the tire, and
    wherein the low-pressure is determined by a multiplying event of a frequency alarm and a dynamic radius alarm.

2. The apparatus of claim 1, wherein the frequency calculating unit is further configured to generate effective flags for each speed interval by comparing the number of the frequency data accumulated for each speed interval with a predetermined number and calculates a speed interval specific mean frequency when the effective flags are generated in all speed intervals.

3. The apparatus of claim 1, wherein the tire searching unit is further configured to determine reliability of frequency calibration by comparing the speed interval specific mean frequency with a prestored tire specific mean frequency and search a tire having a predetermined calibration level or more when the calculated reliability of the frequency calibration and the predetermined calibration level are compared.

4. The apparatus of claim 3, wherein the tire searching unit is further configured to select a predetermined tire as a tire mounted on a vehicle when the number of calculation times of the calculated reliability of the frequency calibration is equal to or more than a predetermined number of calculation times.

5. The apparatus of claim 3, wherein the low-pressure threshold selecting unit is further configured to select a low-pressure probability threshold by changing a predetermined low-pressure probability value according to the calculated calibration reliability.

6. The apparatus of claim 3, wherein the low-pressure threshold selecting unit is further configured to select the low-pressure probability threshold by decreasing the predetermined low-pressure probability value as the calculated calibration reliability is higher and select the low-pressure probability threshold by increasing the predetermined low-pressure probability value as the calculated calibration reliability is lower.

7. The apparatus of claim 1, wherein the low-pressure determining unit is further configured to determine the low pressure by a multiplying event of a frequency alarm and a dynamic radius alarm according to a Bayes' Rule and determines disturbance as a constant to calculate the integration low-pressure probability, in order to integrate the frequency and dynamic radius low-pressure probabilities.

8. The apparatus of claim 1, wherein the low-pressure determining unit is further configured to determine the low pressure by comparing a predetermined low-pressure probability value and a predetermined dynamic radius low-pressure probability when a driving speed of the vehicle is more than a predetermined driving speed.

9. The apparatus of claim 1, wherein when the low-pressure determining unit is configured to determine that all tires of tires of 4 wheels mounted on the vehicle are at the low pressure, the low-pressure determining unit is further configured to determine the low pressure by comparing the selected low-pressure probability threshold and the frequency low-pressure probability.

10. The apparatus of claim 1, further comprising:
a data storing unit configured to store at least one of a predetermined speed interval specific mean frequency of each tire, a predetermined low-pressure probability value, and the calibration level value depending on the calibration reliability.

11. A method for monitoring a tire pressure according to a tire characteristic in a tire monitoring system (TPMS), the method comprising:
measuring a wheel speed to determine a resonance frequency by a wheel speed sensor;
determining, by a frequency calculating unit, a speed interval specific mean frequency by determining the resonance frequency using a frequency analysis scheme and accumulating and averaging frequency data for more than one speed interval related to a wheel speed;
detecting, by a tire searching unit, a tire corresponding to the speed interval specific mean frequency by comparing the speed interval specific mean frequency with a prestored tire specific mean frequency;
selecting, by a low-pressure threshold selecting unit, a low-pressure probability threshold from a predetermined low-pressure probability value depending on the detected tire;
determining, by a low-pressure determining unit, an integration low-pressure probability by integrating a frequency low-pressure probability and a dynamic radius low-pressure probability; and
determining, by a low-pressure determining unit, a low pressure by comparing the selected low-pressure probability threshold with an integration low-pressure probability, wherein the integration low-pressure probability is acquired by integrating the frequency data and dynamic radius low-pressure probabilities,
wherein the frequency analysis scheme acquires the frequency data from the wheel speed sensor,
wherein the low-pressure indicates an alarm with regard to an air pressure of the tire, and
wherein the low pressure is determined by a multiplying event of a frequency alarm and a dynamic radius alarm.

12. The method of claim 11, further comprising:
generating, by the frequency calculating unit, a speed interval specific effective flag by comparing the number of the frequency data accumulated for each speed interval with a predetermined number, wherein in the calculating of the mean frequency, when the effective flags are generated in all speed intervals, the speed interval specific mean frequency is calculated.

13. The method of claim 11, further comprising:
calculating, by the tire searching unit, reliability of frequency calibration by comparing the speed interval specific means frequency and a prestored tire specific mean frequency.

14. The method of claim 13, wherein in the searching of the tire, the calculated reliability of the frequency calibration and a preset calibration level are compared with each other to search a tire in which the reliability of the frequency calibration is equal to or more than the preset calibration level.

15. The method of claim 13, further comprising:
comparing, by the tire searching unit, the number of calculation times of the calculated reliability of the frequency calibration and a predetermined number of calculation times with each other, wherein in the searching of the tire, a predetermined tire is selected as a tire mounted on a vehicle when the number of calculation times of the calculated reliability of the frequency calibration is equal to or more than a predetermined number of calculation times.

16. The method of claim 13, wherein in the selecting of the low-pressure probability threshold, the low-pressure probability threshold is selected by changing a predetermined low-pressure probability value according to the calculated calibration reliability.

17. The method of claim 13, wherein in the selecting of the low-pressure probability threshold, the low-pressure probability threshold is selected by decreasing the predetermined low-pressure probability value as the calculated calibration reliability is higher and the low-pressure probability threshold is selected by increasing the predetermined low-pressure probability value as the calculated calibration reliability is lower.

18. The method of claim 11, wherein in the determining of the low pressure, the low pressure is determined by a multiplying event of a frequency alarm and a dynamic radius alarm according to a Bayes' Rule and disturbance is determined as a constant to calculate the integration low-pressure probability, in order to integrate the frequency and dynamic radius low-pressure probabilities.

19. The method of claim 11, further comprising:
verifying whether a driving speed of a vehicle is more than a predetermined driving speed, wherein in the determining of the low pressure, the low pressure is determined by comparing a predetermined low-pressure probability value and a predetermined dynamic radius low-pressure probability.

20. The method of claim 11, wherein in the determining of the low pressure, when it is determined that all tires of tires of 4 wheels mounted on the vehicle are at the low pressure, the low pressure is determined by comparing the selected low-pressure probability threshold and the frequency low-pressure probability.

* * * * *